Oct. 22, 1957     H. D. WILLIAMS     2,810,463
FRICTION TYPE REVERSIBLE DRIVE UNIT FOR WRENCHES, AND THE LIKE
Filed May 11, 1953
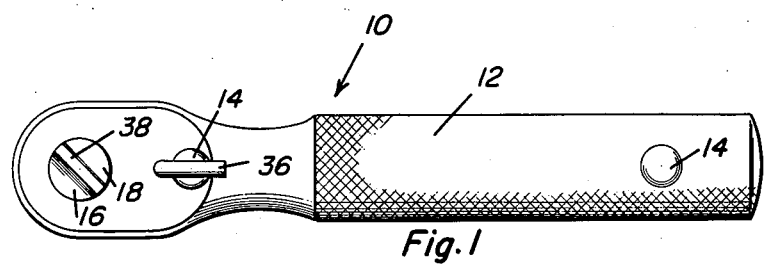
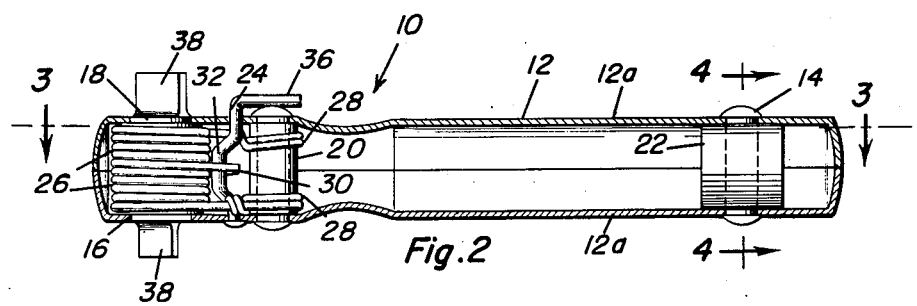
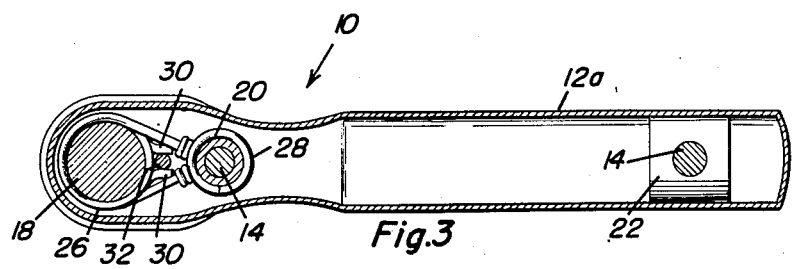
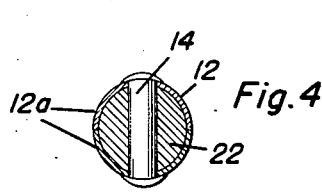
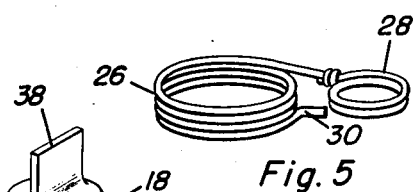
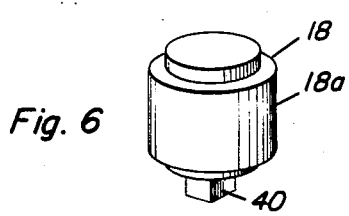
Harry D. Williams
INVENTOR.

United States Patent Office 2,810,463
Patented Oct. 22, 1957

2,810,463

FRICTION TYPE REVERSIBLE DRIVE UNIT FOR WRENCHES AND THE LIKE

Harry D. Williams, Columbus, Ind.

Application May 11, 1953, Serial No. 354,229

2 Claims. (Cl. 192—43)

This invention relates to new and useful improvements and structural refinements in drive units for wrenches, screwdrivers, and similar tools, and the principal object of the invention is to provide an improved, reversible, friction type drive unit of the commonly known "ratchet" variety, such as may be conveniently and effectively employed for imparting uni-directional intermittent rotation to a bolt, a nut, a screw, or the like.

The important feature of the invention resides in the provision of an improved friction type drive which, unlike a conventional ratchet mechanism, does not depend upon its operation for the engagement of a pawl with a series of ratchet teeth, but which utilizes a resilient, friction type engagement, capable of taking hold in any position, not necessarily coinciding with the spacing of the teeth in a conventional ratchet mechanism.

Some of the advantages of the invention reside in its simplicity of construction, in its efficient and dependable operation and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a top plan view of the invention;

Figure 2 is a vertical longitudinal sectional view thereof;

Figure 3 is a sectional view, taken substantially on the plane of the line 3—3 in Figure 2;

Figure 4 is a sectional detail, taken substantially on the plane of the line 4—4 in Figure 2;

Figure 5 is a perspective view of one of the springs used in the invention; and

Figures 6 and 7 are perspective views illustrating two types of drive members such as may be used in the invention.

Like characters of reference are employed to designate like parts in the specification and throughout the several views.

Referring now to the accompanying drawings in detail, the general reference character 10 designates the complete drive unit, the same embodying in its construction an elongated handle 12 which is preferably formed from a pair of complemental, abutting sections 12a which are rigidly secured together by a plurality of transversely extending rivets or other fastening elements 14.

One end portion of the handle 12 is provided with coaxial apertures or openings constituting a socket 16 for a rotatable drive member 18, and one of the rivets 14 which is disposed immediately adjacent the drive member 18 is provided with a tubular bushing 20 which also functions as a combined reinforcing and spacing member for the handle sections 12a. The other rivet 14 is provided with a spacer 22 which is disposed within the hollow interior of the handle 12, as is clearly shown in Figures 2 and 4.

A pair of helical springs 26, wound in relatively opposite directions, are positioned on the cylindrical lateral surface 18a of the drive member 18, one end of each spring being provided with a loop 28 which is anchored on the aforementioned bushing 20. The remaining ends 30 of the two springs are disposed in spaced, juxtaposed relation in which they straddle an intermediate, axially offset crank portion 32 of a control rod member 34 which is rotatably mounted in the handle 12 adjacent the drive member 18 and is provided with an actuating finger piece 36.

It will be apparent from the foregoing that when the handle 12 is oscillated (after applying the drive member 18 to the work) and the control member 34 is swung by means of the finger piece 36 to one side or the other, the intermediate portion 32 thereof will deflect the end portion 30 of the appropriate spring 26 to one side of the drive member 18, thus causing that spring to frictionally grip the cylindrical surface 18a of the drive member and impart rotation thereto concurrently with the actuation of the handle.

During the return movement in the oscillation of the handle 12, the particular spring which previously drove the member 18 will simply slip on the cylindrical surface 18a thereof. As will be readily apparent, by turning the finger piece 36 in one direction or the other, intermittent, rotary motion may be imparted to the drive member 18 in either direction, as desired.

As shown in Figure 7, the drive member 18 is provided with a pair of drive elements 38, such as, for example, may properly engage a screw, or the like, while in the modified form illustrated in Figure 6, the drive member is provided with a polygonal adapter 40 to fit the socket of a wrench.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A friction type reversible drive unit for wrenches, screwdrivers and the like, said drive unit comprising an elongated hollow handle provided in one end portion thereof with a transverse socket, a cylindrical drive member mounted in said socket for rotation about an axis transverse to said handle, a pair of coil springs surrounding the drive member and coiled thereon in relatively reverse directions, and control means provided on said handle and rotatable about an axis offset from the axis of said springs for selectively urging said springs into frictional engagement with the drive member when said handle is rotated in opposite directions about the axis of the drive member.

2. The structure as defined in claim 2 wherein each of said springs has one end thereof permanently anchored to said handle, the other ends of said springs being disposed in spaced juxtaposed relation, and said means including a control rod pivotally mounted in said handle and having an offset crank portion disposed between said other ends of said springs, whereby the same may be urged selectively in opposite directions relative to said drive member.

References Cited in the file of this patent

UNITED STATES PATENTS

| | | |
|---|---|---|
| 255,957 | English | Apr. 4, 1882 |
| 1,704,062 | Starkey | Mar. 5, 1929 |
| 2,138,331 | Ward | Nov. 29, 1938 |
| 2,446,064 | Smith | July 27, 1948 |
| 2,512,755 | Vosper | June 27, 1950 |
| 2,595,213 | Raynor | Apr. 29, 1952 |

FOREIGN PATENTS

| | | |
|---|---|---|
| 693,258 | Germany | July 4, 1940 |